United States Patent
Dalla Valle et al.

(10) Patent No.: US 12,302,973 B2
(45) Date of Patent: May 20, 2025

(54) SEMIAUTOMATIC APPARATUS AND METHOD FOR SURFACE TREATMENT OF ITEMS OF CLOTHING USING A LASER SOURCE

(71) Applicant: NEXIA SRL, Rosa' (IT)

(72) Inventors: Vittorio Dalla Valle, Lugo di Vicenza (IT); Emara Hossameldin, Nove (IT)

(73) Assignee: NEXIA SRL, Rosa' (IT)

( * ) Notice: Subject to any disclaimer, the term of this patent is extended or adjusted under 35 U.S.C. 154(b) by 638 days.

(21) Appl. No.: 17/611,591

(22) PCT Filed: May 15, 2020

(86) PCT No.: PCT/IB2020/054620
§ 371 (c)(1),
(2) Date: Nov. 16, 2021

(87) PCT Pub. No.: WO2020/234720
PCT Pub. Date: Nov. 26, 2020

(65) Prior Publication Data
US 2022/0243374 A1    Aug. 4, 2022

(30) Foreign Application Priority Data

May 17, 2019 (IT) .......................... 102019000006958

(51) Int. Cl.
*A41H 43/00* (2006.01)
*B23K 26/00* (2014.01)
(Continued)

(52) U.S. Cl.
CPC ......... *A41H 43/00* (2013.01); *B23K 26/0006* (2013.01); *B23K 26/0604* (2013.01);
(Continued)

(58) Field of Classification Search
CPC ................ A41H 43/00; B23K 26/0006; B23K 26/0604; B23K 26/0823; B23K 26/16; B23K 2103/38; D06C 23/02
(Continued)

(56) References Cited

U.S. PATENT DOCUMENTS

| | | | | |
|---|---|---|---|---|
| 6,002,099 A | * | 12/1999 | Martin | G06K 1/126 358/1.7 |
| 6,819,972 B1 | * | 11/2004 | Martin | D06C 23/02 700/131 |

(Continued)

FOREIGN PATENT DOCUMENTS

| | | |
|---|---|---|
| DE | 2657392 A1 | 6/1977 |
| WO | 03002811 A2 | 1/2003 |

(Continued)

*Primary Examiner* — Thien S Tran
*Assistant Examiner* — Simpson A Chen
(74) *Attorney, Agent, or Firm* — QuickPatents; Kevin Prince

(57) ABSTRACT

A semiautomatic apparatus for surface treatment of items of clothing using a laser source, in which the items have front, rear and side surfaces, the apparatus includes support means, rotating about substantially vertical axes, movement means for moving the support means and laser means for surface treatment of the items. The laser means include at least one first laser generator and a second laser generator for directing laser beams respectively to the front, the rear and/or the side surfaces of the items to be treated, and the support means include multiple arms configured to move from a loading/unloading station for an item to be treated or being treated to two work stations for the items to be treated. A passage is provided for an operator to access the loading/unloading station, the generators are located at opposite sides of the passage to avoid interference of the laser beams with the operator.

10 Claims, 3 Drawing Sheets

(51) Int. Cl.
  *B23K 26/06* (2014.01)
  *B23K 26/08* (2014.01)
  *B23K 26/16* (2006.01)
  *B23K 103/00* (2006.01)
(52) U.S. Cl.
  CPC .......... *B23K 26/0823* (2013.01); *B23K 26/16* (2013.01); *B23K 2103/38* (2018.08)
(58) Field of Classification Search
  USPC ..................................................... 219/121.6
  See application file for complete search history.

(56) References Cited

U.S. PATENT DOCUMENTS

| | | | |
|---|---|---|---|
| 2003/0000929 A1* | 1/2003 | Bowker | B23K 26/0823 219/121.68 |
| 2015/0060422 A1* | 3/2015 | Liebl | B23K 26/1464 219/121.78 |

FOREIGN PATENT DOCUMENTS

| | | |
|---|---|---|
| WO | 03029545 A1 | 4/2003 |
| WO | 2014120105 A1 | 8/2014 |
| WO | 2018011447 A1 | 1/2018 |

* cited by examiner ical problem addressed by the present invention is, in short, to provide an apparatus that can increase the effectiveness of treatment of an item of clothing using a laser beam and that affords quick and uniform surface treatment of an item of clothing.

SEMIAUTOMATIC APPARATUS AND METHOD FOR SURFACE TREATMENT OF ITEMS OF CLOTHING USING A LASER SOURCE

FIELD OF THE INVENTION

The present invention generally finds application in the field of fabric treatment and particularly relates to a semiautomatic apparatus for surface treatment of items of clothing using a laser source.

The invention also relates to a method for surface treatment of items of clothing using a laser source by means of the aforementioned apparatus.

BACKGROUND

Apparatus and methods for surface treatment of items of clothing using a laser beam have long been known in the field of fabric treatment to artificially mimic a natural worn appearance.

Generally, the laser beam causes local heating of the fabric of the item of clothing, thereby causing vaporization of the dye in the treated areas which take on a hue other than the base color of the fabric.

The apparatus generally comprises a scanner having a laser generator connected thereto for directing the laser beam against the surface of the item of clothing based on preset software stored in a microprocessor control unit for programming the generator and the scanner.

Namely, the control unit stores drawings to be reproduced on the item to be treated by the movement of the laser beam to reproduce the wear lines for mimicking the worn appearance of the item, for example, at the bottom and rear pockets of a pair of denim pants, as disclosed for example in WO2018011447.

Generally, the apparatus comprises a treatment chamber containing item-supporting means having multiple arms rotating about vertical axes and laser means for treating the items being processed.

WO03029545 discloses an apparatus for surface treatment of denim pants using a laser beam, which comprises a carousel which has a plurality of radially spaced arms each adapted to support a pant mannequin and can move through a plurality of work stations around the carousel.

The work stations include an item-loading station, a laser treatment station and an item-unloading station other than the loading station.

In addition, each of the mannequins comprises an articulated mechanism which is selectively operable by an operator and can be moved between a retracted state to facilitate positioning of a pair of pants at the loading station and an expanded state which supports the pants in a predetermined position at the treatment station.

WO03002811 discloses a laser system for treatment of items of clothing which comprises a laser beam generator, a scanner for pointing the laser beam on the item and a treatment chamber containing a plurality of mannequins, each having support means for placing the item of clothing in the position it assumes when worn.

The support means of each mannequin are connected to first movement means which are adapted to move each mannequin from a first treatment station, located proximate to the scanner, to a loading/unloading station and vice versa.

Furthermore, the support means comprise expanded air chambers to facilitate expansion of the item of clothing when it reaches the treatment station.

A first drawback of all these known solutions is that each item of clothing must be handled several times for its entire surface to be processed.

This drawback is particularly inconvenient when treating items that have front, rear and side surfaces to be treated, which will increase the overall treatment times and labor costs required to rotate the item.

In addition, the apparatus comprises a single generator allowing treatment of a single item at a time.

A further drawback of this arrangement is that the laser beam generator is usually pointed toward the garment loading/unloading station with a consequent risk of interfering with the operator as he/she accesses the loading/unloading station.

In view of the prior art, the technical problem addressed by the present invention is, in short, to provide an apparatus that can increase the effectiveness of treatment of an item of clothing using a laser beam and that affords quick and uniform surface treatment of an item of clothing.

SUMMARY

The object of the present invention is to obviate the above discussed drawback, by providing a semiautomatic apparatus and a method for surface treatment of items of clothing using a laser source, that are highly efficient and relatively cost-effective.

A particular object of the present invention is to provide a semiautomatic apparatus and a method for surface treatment using a laser source as described above that can afford very quick surface treatment of an item of clothing.

A further object of the present invention is to provide a semiautomatic apparatus and a method for surface treatment using a laser source as described above that can afford uniform surface treatment of an item of clothing.

Another object of the present invention is to provide a semiautomatic apparatus and a method for surface treatment using a laser source as described above, that require no particular handling by an operator during treatment.

A further object of the present invention is to provide a semiautomatic apparatus for surface treatment using a laser source as described above that increases safety for an operator in charge of operating it.

Yet another object of the present invention is to provide a semiautomatic apparatus for surface treatment using a laser source as described above that has a reduced size.

These and other objects, as more clearly explained hereafter, are fulfilled by a semiautomatic apparatus for surface treatment of items of clothing using a laser source.

The items of clothing, such as denim jeans, have front, rear and side surfaces, and the apparatus comprises support means, rotating about substantially vertical axes, movement means for moving the support means about the vertical axes and laser means for surface treatment of the items.

The laser means comprise at least one first and one second laser generators for directing laser beams respectively to the front surface, the rear surface and/or the side surfaces of the items to be treated.

According to a peculiar aspect of the invention, the support means comprise multiple arms configured to move from a loading/unloading station for an item to be treated/being treated to two work stations for the items to be treated, simultaneously facing the generators.

Advantageously, the apparatus comprises a passage for an operator to access the loading/unloading station and the first and second generators are located at the opposite sides of the passage to avoid interference of the laser beams with the operator upon access thereof to the loading/unloading station.

With this combination of features, the apparatus can increase the effectiveness of treatment of an item of clothing and can afford very quick and uniform surface treatment.

The support means comprise a main shaft extending along a substantially vertical axis with a plurality of radial arms radially extending therefrom and having respective supports for individual items being rotatably mounted to secondary shafts also vertically extending from the ends of said arms.

Furthermore, the apparatus is configured to have at least three arms radially arranged at angular distances of 120° and the secondary shafts and their respective supports rotate through an angle of about 180° as they selectively move from the loading/unloading station to the first and second work stations.

Thus, the apparatus can simultaneously process both the front and rear surfaces of at least two items of clothing while a third item is loaded/unloaded by an operator in the loading/unloading station.

The invention also relates to a method for surface treatment of items of clothing.

Advantageous embodiments of the invention are obtained in accordance with the dependent claims.

BRIEF DESCRIPTION OF THE DRAWINGS

Further features and advantages of the invention will appear more clearly from the detailed description of a preferred, non-exclusive embodiment of a semiautomatic apparatus for surface treatment of items of clothing using a laser source, which is described as a non-limiting example with the help of the annexed drawings, in which.

DETAILED DESCRIPTION OF THE PREFERRED EMBODIMENTS

Particularly referring to the figures, there is shown a semiautomatic apparatus, generally referenced 1, for surface treatment of items of clothing C using a laser source.

By way of example and without limitation, the apparatus 1 may be used for treating jeans, shirts or jackets made of denim fabric or the like and the items of clothing C have front surfaces SF, rear surfaces SB and side surfaces CL adapted for treatment by a laser source.

Figure 1:
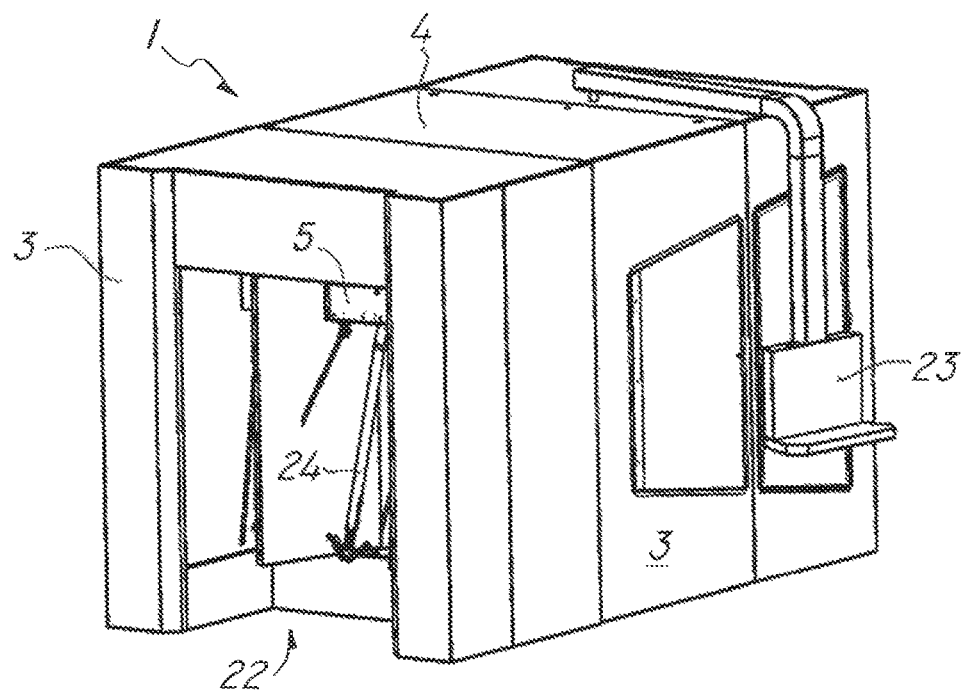
FIG. 1 is a perspective view of a semiautomatic apparatus of the invention.
Figure 2:
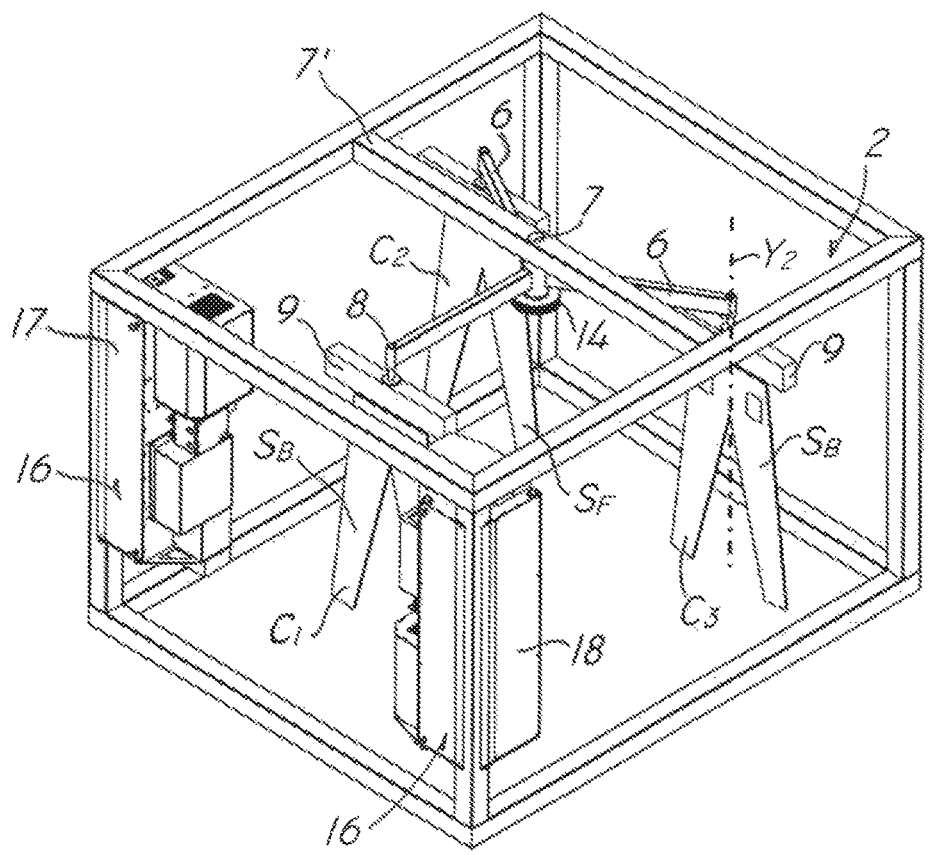
FIG. 2 is a perspective view of a detail of the treatment chamber of the apparatus of FIG. 1.
Figure 3:
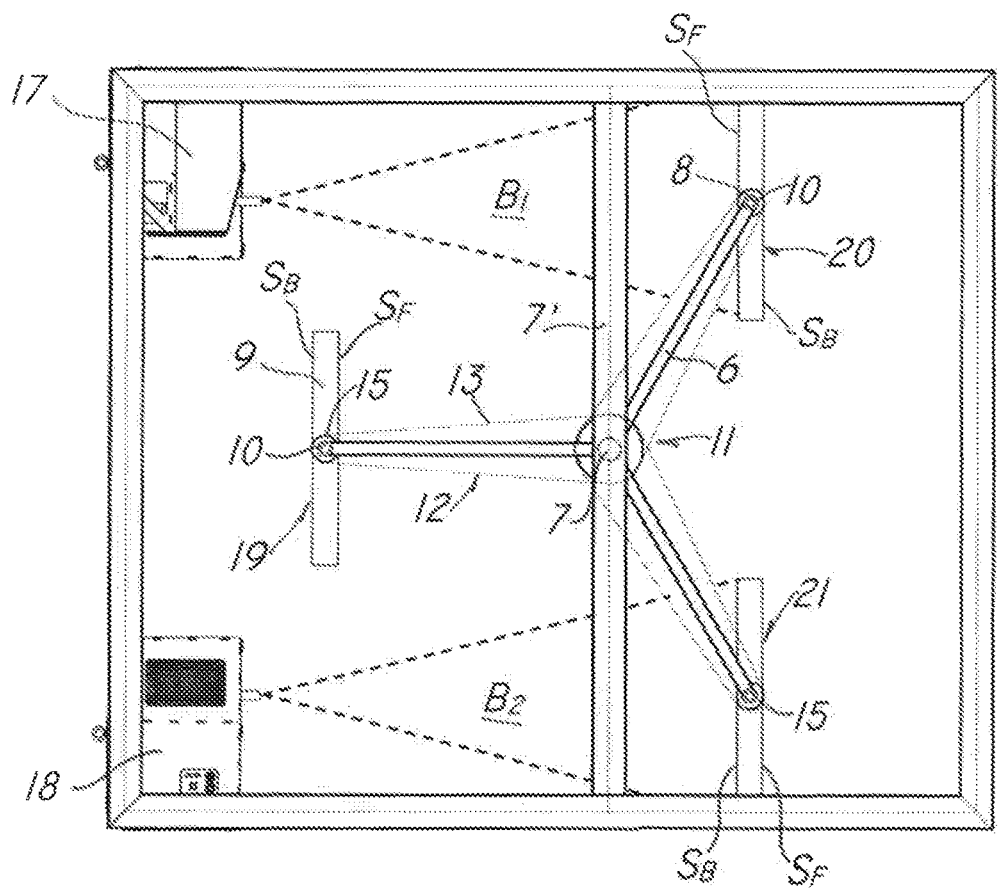
FIGS. 3 and 4 are a top view and a side view of the apparatus of FIG. 2 respectively.
Figure 4:
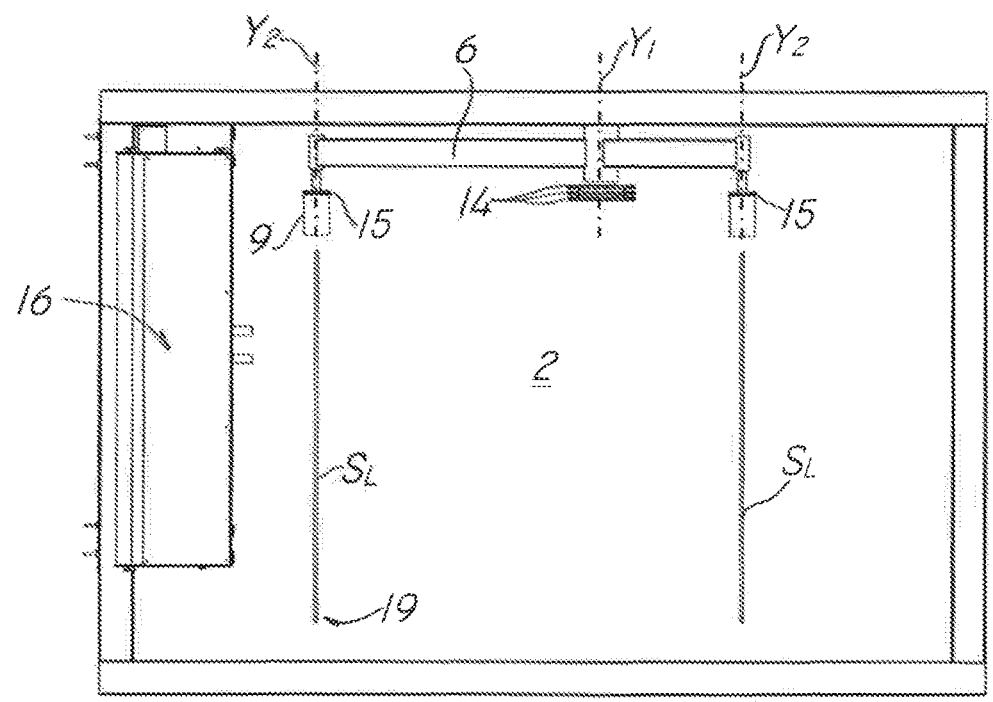

In a preferred configuration of the invention, as shown in FIGS. 1 and 2, the apparatus 1 comprises a substantially prismatic treatment chamber 2 which is at least partially closed by a plurality of side walls 3 and by a substantially horizontal ceiling 4.

As best shown in FIGS. 2 to 6, the treatment chamber 2 contains support means 5 for the items C having multiple arms 6 rotating about substantially vertical axes Y1, Y2.

In particular, the support means 5 comprise a main shaft 7 extending along a substantially vertical axis Y1 with a plurality of radial arms 6 radially extending therefrom and having respective supports 9 for individual items C rotating about secondary axes Y2 and mounted to secondary shafts 10 also vertically extending from the ends 8 of the arms 6.

In a preferred embodiment of the invention, as shown in the figures, the main shaft 7 is located at the center line of a substantially horizontal beam 7' and the support means 5 comprise at least three arms 6 radially arranged at 120°.

As is known per se, the treatment chamber 2 comprises movement means 11 therein for moving the support means 5 about the vertical axes Y1, Y2.

Furthermore, the movement means 11 may comprise an electric motor, not shown, associated with the main shaft 7 to allow the latter to rotate about the main axis Y1 and movement means 12 for rotating the secondary shafts 10 about their respective secondary axes Y2.

Preferably, the movement means 12 may comprise drive devices selected from the group comprising electric motors, closed-loop mechanical drives 13 or the like.

In the illustrated example, the movement means 12 may comprise a plurality of closed-loop belts or chains 13 each wound between a first gear wheel 14 keyed on the main shaft 7 and a second gear wheel 15 keyed on the secondary shaft 10, as best shown in FIGS. 2 to 6.

Thus, the movement means 12 may allow the rotational motion of the main shaft 7 to be transferred to the supports 9 for the individual items C, which are keyed on the secondary shafts 10 of each arm 6.

In the embodiment as shown in the figures, the first gear wheel 14 has a diameter greater than the second gear wheel 15 so that a rotation of the main shaft 7 by a predetermined angle will correspond to a rotation of the secondary shaft 10 by an angle greater than the predetermined angle.

For example, at each rotation of the main shaft 7 by a predetermined angle of 120°, the secondary shaft 10 of each arm 6 may rotate by an angle of about 180°, as further described below.

In an alternative embodiment of the invention, the movement means 12 may be of automatic type, controlled by the electric motor of the main shaft 7 so that the rotation value of each secondary shaft 10 may be adjusted at will.

For example, an item C may be placed on a support 9 in such a position that the rear surface SB will face a wall 3 of the treatment chamber 2. Here, the corresponding secondary shaft 10 may rotate by an angle of about 60° only once the main shaft 10 has been rotated by a predetermined angle of 120° to cause the front surface SF to face the wall 3.

Advantageously, the apparatus 1 comprises laser means 16 for surface treatment of the items C being processed and contained in the treatment chamber 2.

Advantageously, the laser means 16 comprise at least one first 17 and one second laser generators 18 for directing laser beams B1, B2 respectively to the front surface SF, the rear surface SB and/or the side surfaces SL of the items C to be treated.

According to a peculiar aspect of the invention, the support means 5 are configured to move from a loading/unloading station 19 for an item C to be treated/being treated to two work stations 20, 21 for the items C to be treated, simultaneously facing the generators 17, 18.

Thus, the apparatus 1 of the invention can afford simultaneous treatment of multiple items of clothing C1, C2, C3 in a single working cycle, thereby reducing the overall treatment times.

Therefore, while one item C1 is loaded/unloaded by an operator in the loading/unloading station 19, the first generator 17 faces another item of clothing C2, that has been previously loaded, for treatment of its front surface SF in a first work station 20 and the second generator 18 faces another item C3, that has been previously processed in the work station 20, for treatment of its rear surface SB in a second work station 21.

Preferably, the movement means 12 are configured to rotate the secondary shafts 10 by an angle of about 180° during selective movement from the loading/unloading station 19 to the first 20 and second work stations 21.

Therefore, when an item C moves from the loading/unloading station 19 to the first work station 20 it rotates by an angle of about 180° relative to a viewer located at one of the walls 3 of the treatment chamber 2.

Likewise, when the item C moves from the first work station 20 to the second work station 21 or from the second work station 21 to the loading/unloading station 19, the item C rotates by about 180° at each step.

Figure 5:
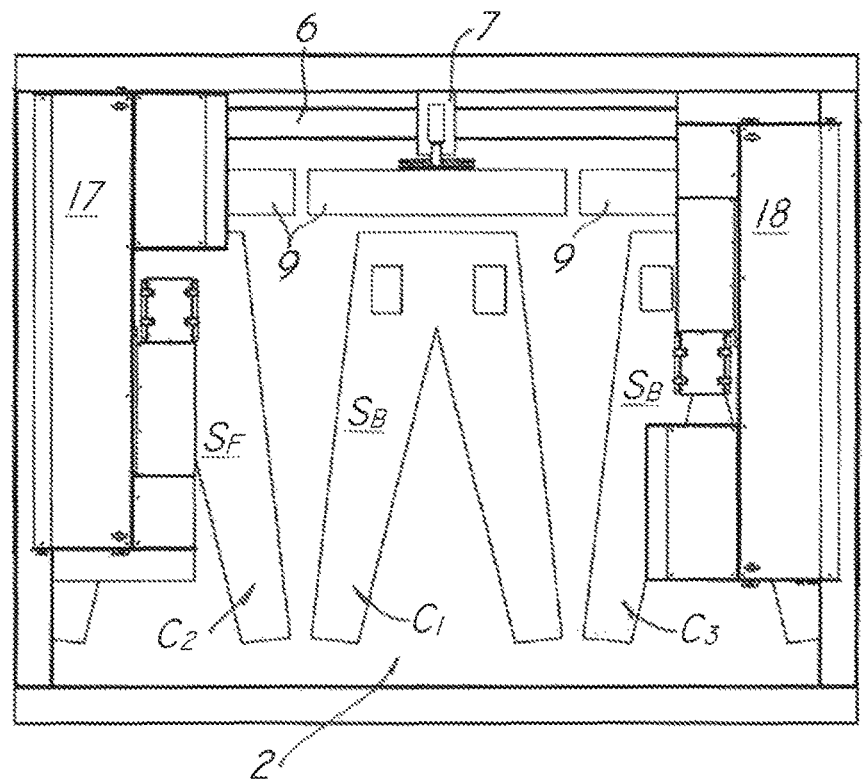
FIGS. 5 and 6 are a front view and a rear view of the apparatus of FIG. 2 respectively.
Figure 6:
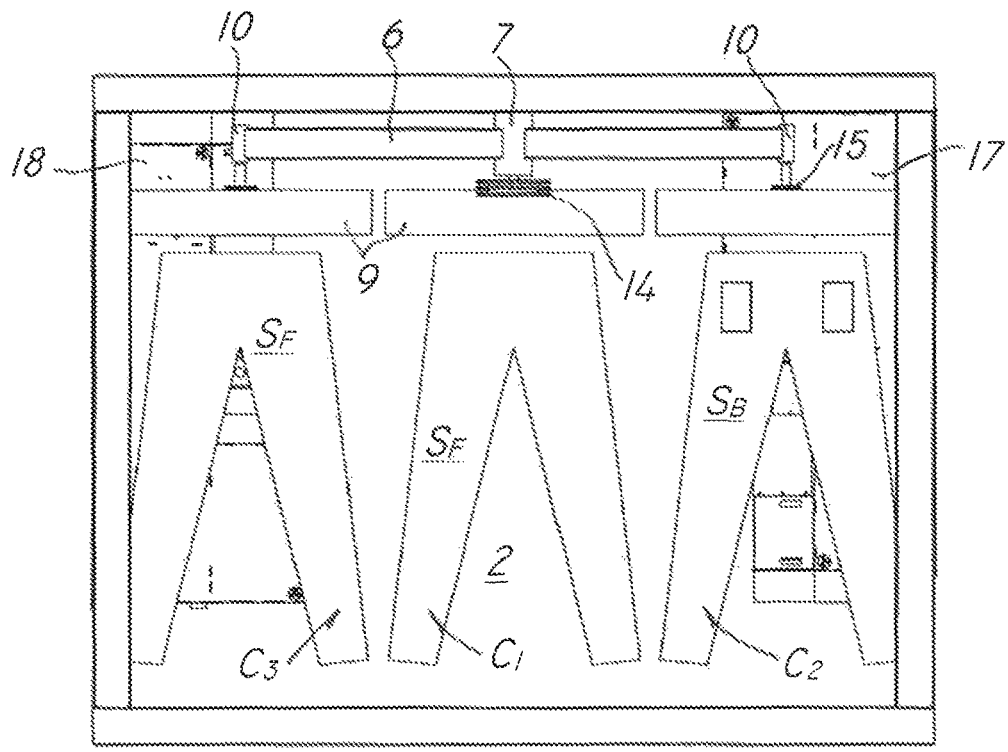

In FIGS. 2, 5 and 6, the item of clothing C1 in the loading/unloading station 19 is shown for convenience as it is loaded into the apparatus 1, with its rear surface SB facing the operator.

Advantageously, the treatment chamber 2 has a passage 22 for an operator at the loading/unloading station 19 and the first 17 and second generators 18 are placed at the opposite sides of the passage 22 to avoid interference with the operator during access to the loading/unloading station 19.

It will be appreciated that the position of the generators 17, 18 relative to the passage 22 of the loading/unloading station 19 and the position of the work stations 20, 21 can increase the operator's safety as compared to that obtained with a known apparatus, for example, with a single generator directed toward the operator in charge of loading/unloading the items of clothing.

The operator's safety and the processing times are further guaranteed in that the movement means 11 comprise a microprocessor control unit 23 for programming the processing operations to be carried out on the surfaces SF, SB, SL of the items to be treated C, calculating the processing times according to the processing operations to be carried out, the rotation of the main shaft 7 and of the movement means 12 and the emission of the laser beams B1, B2 by the generators 17, 18.

Advantageously, the control unit 23 may be connected to a scanner of a well-known type, which is adapted to check the position of the item of clothing C relative to the supports 9 to read the useful surface to be treated with the laser beams B1, B2 of their respective generators 17, 18.

In the illustrated example, the control unit 23 is also connected to automatic pointing means for pointing the laser beams B1, B2 to treat each item C throughout its surface area.

According to a further aspect of the invention, the support means 5 comprise respective mannequins 24 connected to the supports 9 of each arm 6 and selectively inflatable/deflatable to facilitate loading/unloading of the item of clothing C.

As is known per se, the multiple arms 6 may comprise respective channels, not shown, for introducing compressed air into each of the mannequins 24.

For example, when a support 9 of an arm 6 is placed in the loading/unloading station 19, its respective mannequin 24 may be deflated for unloading one item C and loading the next item C and then inflated for the loaded item C to remain joined to the mannequin 24 as it moves through the work stations 19, 20.

Thus the scanner and the pointing means, also not shown, may increase the treatment efficiency of the apparatus 1, while reducing the number of undesired folds or gaps.

Conveniently, the treatment chamber 2 may also comprise a system for extracting the fumes produced by the generators 17, 18 while the items of clothing C that face them are being treated.

In a further aspect, the invention relates to a method for surface treatment of items of clothing C using a laser source by means of an apparatus 1 of the above discussed type.

The method of the invention includes a first step a) of loading the item C onto a support 9 mounted at the end 8 of a radial arm 6 in a loading/unloading station 19.

By way of example, in the loading step a), the operator may load the item C with its rear surface SB facing the passage 22 of the treatment chamber 2.

The next step is a step of b) rotating the arm 6 through a first angular step of 120° to move the item C into a first work station 20 facing a first generator 17 of a laser beam B1 during a first rotation of the support 9 through about 180° to cause the front surface SF of the item C to face the first generator 17.

A step is further provided of c) driving a first generator 17 of a laser beam B1 for treating the front surface SF of the item C, facing the first generator 17.

Then a step is provided of d) rotating the arm 6 through a second angular step of 120° to move the item C into a second work station 21 facing a second generator 18 of a laser beam B2 during a second rotation of the support 9 by about 180° to cause the rear surface SB of the item C to face the second generator 18.

Preferably, the first generator 17 and the second generator 18 are placed at the opposite sides of the passage 22 to avoid any interference of the laser beams B1, B2 with the operator.

The last steps are a step of e) driving a second generator 18 of a laser beam B2 for treating the rear surface SB of the item C that faces the second generator 18, and a step of f) rotating the arm 6 through a third angular step of 120° to move the item C into the loading/unloading station 19 during a third rotation of the support 9 by about 180° to cause the front surface SF of the item C to face the operator to facilitate unloading thereof.

According to a peculiar aspect of the invention, in the method of the invention, the steps a) to f) carried out on one item C are cyclically repeated on another item C and the steps of c) and e) driving the generators 17, 18 are carried out simultaneously to reduce the working times.

In other words, the operator may load/unload an item C1 located in the loading/unloading station 19 while the generators 17, 18 are treating respectively the front surface SF and the rear surface SB of two other items of clothing C2, C3 in the first 20 and second work stations 21 respectively.

The above description clearly shows that the semiautomatic apparatus for surface treatment of items of clothing using laser sources and the corresponding method fulfill the intended objects and namely can increase the item treatment effectiveness and afford very quick and uniform surface treatment of an item of clothing.

The apparatus and method of the invention are susceptible to a number of changes or variants, within the inventive concept disclosed in the annexed claims.

While the semiautomatic apparatus has been described with particular reference to the accompanying figures, the numerals referred to in the disclosure and claims are only used for the sake of a better intelligibility of the invention and shall not be intended to limit the claimed scope in any manner.

Reference herein to "one embodiment" or "the embodiment" or "some embodiments" indicates that a particular characteristic, structure or member that is being described is included in at least one embodiment of the inventive subject matter.

Furthermore, the particular characteristics, structures or members may be combined together in any suitable manner to provide one or more embodiments.

The present invention may find application in industry, because it can be produced on an industrial scale in the field of fabric processing.

The invention claimed is:

1. A semiautomatic apparatus (1) for surface treatment with a laser source of a plurality of items of clothing (C), wherein the items (C) have front (SF), rear (SB) and side (SL) surfaces, said apparatus (1) comprises:
   support means (5) for supporting items (C) rotating about substantially vertical axes (Y1, Y2);
   movement means (11) for moving said support means (5) about said vertical axes (Y1, Y2); and
   laser means (16) for surface treatment of the items (C);
   wherein said laser means (16) comprise at least one first (17) and one second laser generators (18) that simultaneously direct laser beams (B1, B2) respectively to the front surface (SF) of one of the items and the rear surface (SB) of a different item and/or simultaneously to a side surface (SL) of one of the items (C) to be treated and an opposite side surface of a different item;
   wherein a loading/unloading station is provided for both loading the items to be treated and unloading the items after treatment, said loading/unloading station being simultaneously facing both of said first and second laser generators (17, 18);
   said support means (5) comprise multiple arms (6) configured to move from said loading/unloading station (19) of the item (C) to be treated/being treated to two work stations (20, 21) of the items (C) to be treated which are simultaneously facing said generators (17, 18);
   wherein a passage (22) is provided to allow an operator to access to said loading/unloading station (19), said first (17) and said second laser generators (18) being placed on opposite sides of said passage (22) and symmetrically with respect to the passage to avoid any interference of the laser beams (B1, B2) generated by said laser generators (17, 18) with the operator upon access thereof to said loading/unloading station (19).

2. The apparatus as claimed in claim 1, wherein said support means (5) comprise a main shaft (7) having the substantially vertical axis (Y1) from which a plurality of substantially radial arms (6) radially extends, respective supports (9) for individual items (C) being rotatably mounted to secondary shafts (10) also vertically extending from ends (8) of said arms (6).

3. The apparatus as claimed in claim 2, wherein said movement means (11) comprise an electric motor associated with said main shaft (7) and rotation means (12) for rotating said secondary shafts (10).

4. The apparatus as claimed in claim 3, wherein said rotation means (12) comprise drive means selected from the group consisting of: electric motors and closed-loop mechanical drives (13).

5. The apparatus as claimed in claim 3, wherein said rotation means (12) are configured to rotate said secondary shafts (10) by an angle of about 180° during selective movement from said loading/unloading station (19) to said first (20) and second work stations (21).

6. The apparatus as claimed in claim 2, wherein said movement means (11) comprise a microprocessor control unit (23) for programming the processing operations to be carried out on the surfaces (SF, SB, SL) of the items (C) to be treated, calculating the processing times according to the processing operations to be carried out, controlling actuation of said main shaft (7) and of rotation means (12) and emission of the laser beams (B1, B2) by said generators (17, 18).

7. The apparatus as claimed in claim 1, further comprising at least three arms (6) radially arranged at 120°.

8. The apparatus as claimed in claim 1, wherein said support means (5) comprise respective mannequins (24) which are selectively inflatable/deflatable via channels contained in said multiple arms (6) to introduce compressed air to facilitate loading/unloading of the item of clothing (C).

9. The apparatus as claimed in claim 1, further comprising a treatment chamber (2) having said passage (22) and wherein an extraction system is provided for extracting fumes produced by said generators (17, 18) during treatment of the items of clothing (C) that face them.

10. A method of surface treatment of items of clothing (C) using a laser source by means of an apparatus (1) as claimed in claim 1, the method comprises the steps of:
   a) loading the item (C) onto a support (9) mounted at the end (8) of a radial arm (6) in a loading/unloading station (19);
   b) rotating said arm (6) through a first angular step of 120° to move the item (C) into a first work station (20) facing a first generator (17) of a laser beam (B1) during a first rotation of said support (9) through about 180° to cause the front surface (SF) of the item (C) to face said first generator (17);
   c) driving said first generator (17) of a laser beam (B1) for treating the front surface (SF) of the item (C);
   d) rotating said arm (6) through a second angular step of 120° to move the item (C) into a second work station (21) facing a second generator (18) of a laser beam (B2) during a second rotation of said support (9) by about 180° to cause the rear surface (SB) of the item (C) to face said second generator (18);
   e) driving said second generator (18) of a laser beam (B2) for treating the rear surface (SB) of the item (C);
   f) rotating said arm (6) through a third angular step of 120° to move the item (C) into said loading/unloading station (19) during a third rotation of said support (9) through about 180° to cause the front surface (SF) of the item (C) to face the operator and facilitate unloading;
   wherein the steps a) to f) carried out on one item (C) are cyclically repeated on another item (C) and wherein said steps of c) and e) driving said generators (17, 18) are carried out simultaneously to reduce the working times.

* * * * *